(No Model.)

L. GRABAU.
PROCESS OF MANUFACTURING ALUMINIUM.

No. 400,449. Patented Apr. 2, 1889.

x-y.

Witnesses:
W. E. Coulter
E. M. Gallaher

Inventor:
Ludwig Grabau,
Henry Ott

UNITED STATES PATENT OFFICE.

LUDWIG GRABAU, OF HANOVER, GERMANY.

PROCESS OF MANUFACTURING ALUMINIUM.

SPECIFICATION forming part of Letters Patent No. 400,449, dated April 2, 1889.

Application filed November 19, 1887. Serial No. 255,589. (No specimens.) Patented in Belgium November 14, 1887, No. 79,540; in France November 14, 1887, No. 186,976; in England November 14, 1887, No. 15,593, and in Austria-Hungary October 5, 1888, No. 17,940 and No. 32,832.

*To all whom it may concern:*

Be it known that I, LUDWIG GRABAU, engineer, a subject of the King of Prussia, residing at 41 Schiffgraben, Hanover, Prussia, German Empire, have invented certain new and useful Improvements in the Process of Manufacturing Aluminium, (for which I have obtained Letters Patent in Belgium, No. 79,540, dated November 14, 1887; in France, No. 186,976, dated November, 14, 1887; in Great Britain, No. 15,593, dated November 14, 1887, and in Austria-Hungary, No. 17,940 and No. 32,832, dated October 5, 1888;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
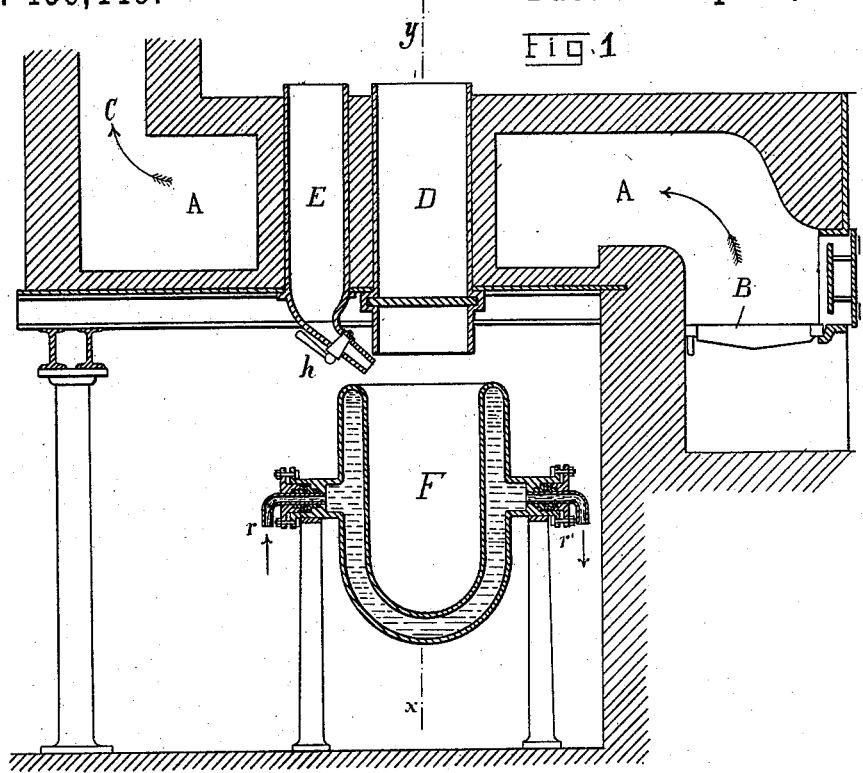
Figure 2:
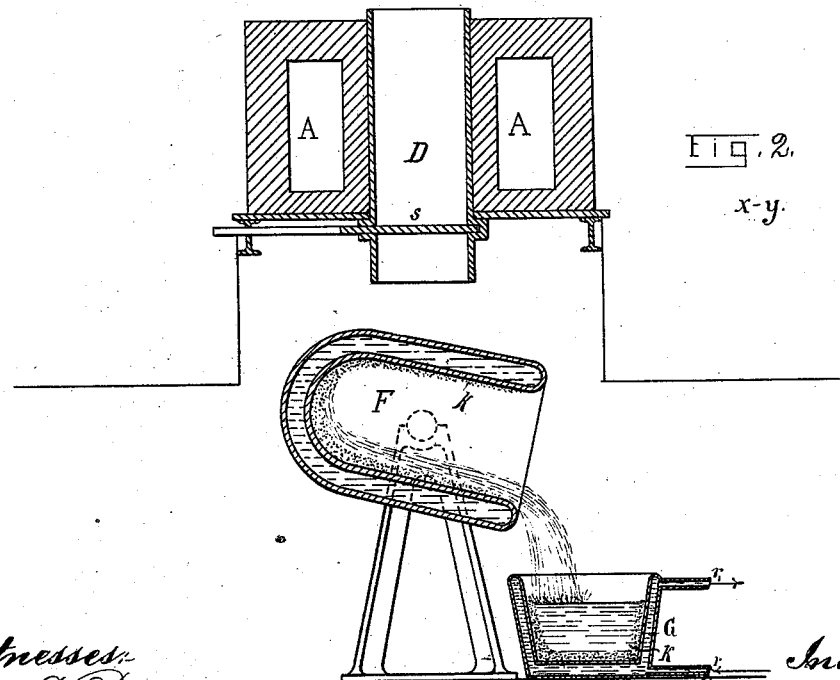

Referring to the drawings, Figure 1 is a vertical longitudinal section of so much of a reducing apparatus as is necessary to illustrate my invention, and Fig. 2 is a vertical transverse section thereof on the line $x\,y$ of Fig. 1.

The invention relates to the production or manufacture of aluminium; and it consists in a novel process of reduction, as hereinafter described and set forth in the claims.

The processes of reduction heretofore in use for the manufacture of aluminium present great inconveniences and difficulties, which tend greatly to enhance the cost of the metal. For instance, it has heretofore been the custom to pour molten aluminium combinations upon a metal of the alkalies. The lighter alkali metal invariably rises to the surface and deflagration ensues. On the other hand, all refractory materials known and heretofore used in the construction of the reducing apparatus (converter, crucible, or furnace) are readily attacked and speedily destroyed by the aluminium alkali fluorides formed in the process of reduction or during the reaction, thus not only entailing expenses in repairs, but also resulting in an inferior and impure product.

This invention has for its object to avoid these difficulties by reversing the mode of procedure and pouring the aluminium fluoride in a pulverulent form upon a molten metal of the alkalies, so that the former will keep the latter covered, and so that the reaction will proceed under cover of the fluoride from below upward, thereby preventing the alkali metal from rising to the surface to avoid deflagration.

To prevent the destruction of the vessel or its lining by the aluminium alkali fluoride formed during the reduction or reaction, I cool the inner surfaces of said vessel or receiver to such an extent as to cause a portion of its contents to congeal by contact therewith and form thereon a lining that is not affected by the molten contents of such receiver.

In carrying out my invention I prefer to so proportion the quantities of aluminium fluoride and alkali metal—as, for instance, sodium—to produce by the reaction the readily-fusible salt ($Al_2F_6,6NaF$,) so that the reduction may be carried out without the addition of a flux.

The following equation, showing the reaction, will also give the proportion of fluoride and alkali metal:

$$2(Al_2F_6)+6Na=Al+2Al_2F_6,6NaF—$$

that is to say, when two parts of aluminium fluoride are added to six parts of metallic sodium, as hereinafter described, the reaction will produce the readily-fusible salt of aluminium and sodium fluoride above referred to and two parts of metallic aluminium. When these proportions are resorted to, I prefer to heat the aluminium fluoride to about 600° centigrade before bringing it in contact with the molten alkali metal, so that the reaction will proceed without further heating under the heat developed by the reaction. Inasmuch as the aluminium fluoride will retain its pulverulent form at the temperature above referred to, when poured on the molten alkali metal it will form a blanket therefor, the reaction will proceed from below upward, the alkali metal will be prevented from rising to the surface, and deflagration is avoided. The advantages resulting from this process will be readily understood, and when coupled with the mode of preventing the destruction of the reducing-vessel or its lining are important factors in the reduction of the cost of manufacture of the aluminium and in the purity thereof. The destruction of the surfaces of the reducing vessel or converter in contact with the aluminium alkali fluoride is absolutely avoided by cooling said surfaces to such a degree as to cause the said salt to congeal thereon and form a protective lining therefor. The result is not only a saving in the expense of relining the converter, but a product free from impurities is thereby also obtained.

Referring to the drawings, A indicates the furnace, in which is arranged a retort, D, for preheating the aluminium fluoride, the said retort being provided with a sliding bottom, so that the contents thereof may be dumped directly into the converter F below the same. In said furnace is also arranged a crucible, E, for fusing the alkali metal, the said crucible being provided with a valved discharge-spout projecting laterally from the bottom of said crucible, so that the contents thereof may also be discharged directly into the converter F below.

B is the grate of the furnace, and C is the chimney.

The converter F is of the class known as a "tipping" converter, and may be of any desired general form. It is constructed with double walls and has hollow trunnions, so that a refrigerant—such as cold water—may be caused to circulate between the walls of the converter to cool its inner surfaces, so as to cause the aluminium alkali fluoride to congeal and form a lining that is not attacked by the molten contents of the converter. The latter may of course be provided with a lid or cover when, for instance, molten aluminium combinations are employed.

G is a vessel into which the contents of the converter are poured after the reaction and the reduction of the aluminium. This vessel is also made with double walls, and a cooling agent caused to circulate between such walls for purposes above set forth—namely, to protect the surfaces in contact with the molten material by forming cryolite lining thereon. A charge of sodium, for instance, is fused in crucible E, and in retort D a charge of aluminium fluoride is heated to about 600° centigrade, after which the fused sodium is tapped off into the converter F, the inner surfaces whereof are kept cool by the circulation between its walls of a refrigerant. The heated aluminium fluoride is then dumped onto the sodium, covering the same, and forming therefor a blanket. The reaction commences at once, and naturally proceeds from below upwardly or from within outwardly, the heavier sodium being prevented from rising to the surface by the lighter pulverulent fluoride, deflagration being thus avoided. An intense heat is developed by the reaction, and as the quantities of fluoride and alkali metal are so chosen that cryolite is formed as a product of the reaction, which is fusible at a red heat, the whole of the contents of the converter enter into fusion, the cryolite congealing upon the cooled converter-walls, and forming thereon a lining that is a bad conductor of heat, and which is not affected by any of the components of the molten charge. On the other hand, in view of the state of fluidity of the charge, the aluminium will collect and is obtained in the form of a regulus without the use of a flux. After the reaction ceases, which with the proportions of materials referred to will take place in a few seconds, the converter may be shaken to hasten the subsidence of the aluminium, and the contents thereof emptied into the vessel G. The lining of cryolite formed in the converter remains, and the operation is repeated. The congealed material in vessel G is readily separated from the congealed aluminium regulus by a few blows with a hammer.

The described mode of forming the protective lining in the converter is not only applicable to the reduction of aluminium fluoride, but also to the reduction of the other halogen combinations, the reaction being produced by the combination of separately-heated materials to produce the heat necessary to the reduction which admits of effecting the reduction in a vessel or converter whose inner surfaces are cooled. This mode is also applicable to the production of aluminium and aluminium alloys from combinations or mixtures of materials adapted to be heated in a cold or cooled vessel or converter to provoke the reaction; hence this method is applicable to the well-known process of reduction hereinbefore referred to, in which fused cryolite containing a flux or a fused mixture of aluminium and sodium chloride, and a flux—such as fluor-spar or cryolite—is poured upon the sodium, as well as to the production of aluminium by the reduction of its halogen salts with magnesium or other like metals by bringing the separately-heated materials together in the converter.

Having thus fully described my invention, what I claim as new, and desire to secure by Letters Patent, is—

1. The herein-described process of producing aluminium from pulverized aluminium fluoride by means of a metal of the alkalies, which consists, first, in infusing a metal of the alkalies; second, in pouring upon the fused metal pulverized aluminium fluoride, and allowing the reaction to take place without further heating and without the use of a flux, substantially as and for the purposes specified.

2. The herein-described process of producing aluminium from pulverized aluminium fluoride by means of a metal of the alkalies, which consists, first, in fusing a metal of the alkalies that will form a readily-fusible salt when combined with pulverized aluminium fluoride; second, heating pulverized aluminium fluoride; third, pouring the heated pulverized aluminium fluoride upon the fused alkali metal, and allowing the reaction to take place without further heating and without the use of a flux, substantially as described.

3. The herein-described process of producing aluminium from pulverized aluminium fluoride by means of a metal of the alkalies, which consists, first, in fusing a metal of the alkalies, and, second, pouring upon the fused metal the pulverized aluminium fluoride and cooling the surfaces of the receiver in which the reaction takes place to congeal a portion of the fused mass and form a lining for said vessel, substantially as and for the purposes specified.

In testimony whereof I affix my signature in presence of two witnesses.

LUDWIG GRABAU.

Witnesses:
E. PHILIPPSTAHL,
JOHN KRACKE.